United States Patent
Nguyen et al.

(10) Patent No.: US 9,405,739 B1
(45) Date of Patent: Aug. 2, 2016

(54) SOURCE CODE FORMAT FOR IDE CODE DEVELOPMENT WITH EMBEDDED OBJECTS

(75) Inventors: Quang H. Nguyen, Kent, WA (US); Thomas H. Tran, Kent, WA (US)

(73) Assignee: The Boeing Company, Chicago, IL (US)

( * ) Notice: Subject to any disclaimer, the term of this patent is extended or adjusted under 35 U.S.C. 154(b) by 819 days.

(21) Appl. No.: 13/209,333

(22) Filed: Aug. 12, 2011

(51) Int. Cl.
 *G06F 9/44* (2006.01)
 *G06F 17/24* (2006.01)
(52) U.S. Cl.
 CPC .................................... *G06F 17/24* (2013.01)
(58) Field of Classification Search
 CPC ..... G06F 17/3089; G06F 11/323; G06F 9/54; G06F 8/20; G06F 17/24; H04L 29/12066; H04L 67/36
 USPC ................. 715/229, 233, 236, 205, 523, 512; 345/744; 705/27, 218; 707/513; 717/113, 140–143; 704/3, 275; 709/218
 See application file for complete search history.

(56) References Cited

U.S. PATENT DOCUMENTS

| | | | | |
|---|---|---|---|---|
| 6,006,242 | A * | 12/1999 | Poole et al. ................... | 715/209 |
| 6,009,441 | A * | 12/1999 | Mathieu et al. ............... | 715/236 |
| 6,061,697 | A * | 5/2000 | Nakao ........................... | 715/229 |
| 6,456,308 | B1 * | 9/2002 | Agranat .................... | G06F 8/20 707/E17.118 |
| 6,549,944 | B1 * | 4/2003 | Weinberg et al. ............. | 709/224 |
| 7,194,679 | B1 * | 3/2007 | Green ............................ | 715/233 |
| 7,603,408 | B1 * | 10/2009 | McGinnis ............... | H03M 7/30 709/203 |
| 7,725,206 | B2 | 5/2010 | Richey | |
| 8,019,489 | B2 | 9/2011 | Harrison et al. | |
| 8,161,045 | B2 | 4/2012 | Arnold et al. | |
| 8,185,609 | B2 | 5/2012 | Fuchs et al. | |
| 8,285,777 | B2 | 10/2012 | Giles et al. | |
| 8,312,533 | B2 | 11/2012 | Price | |
| 2001/0044809 | A1 * | 11/2001 | Parasnis et al. ............... | 707/513 |
| 2001/0052910 | A1 * | 12/2001 | Parekh et al. ................. | 345/744 |
| 2002/0194382 | A1 * | 12/2002 | Kausik ...................... | G06F 9/54 709/246 |
| 2003/0217117 | A1 * | 11/2003 | Dan et al. ...................... | 709/218 |
| 2004/0153378 | A1 * | 8/2004 | Perkowski ....................... | 705/27 |
| 2005/0005258 | A1 * | 1/2005 | Bhogal et al. ................. | 717/102 |
| 2005/0193325 | A1 * | 9/2005 | Epstein ......................... | 715/512 |
| 2006/0174196 | A1 * | 8/2006 | Zhang et al. .................. | 715/523 |
| 2007/0033264 | A1 * | 2/2007 | Edge ................ | H04L 29/12066 709/217 |
| 2008/0208967 | A1 * | 8/2008 | Hilliard et al. ................ | 709/203 |
| 2008/0313143 | A1 | 12/2008 | Warn et al. | |
| 2010/0114822 | A1 * | 5/2010 | Pollock ................... | H04L 67/36 707/623 |
| 2010/0145674 | A1 * | 6/2010 | Dalal et al. ........................ | 704/3 |
| 2010/0205121 | A1 | 8/2010 | Quadracci et al. | |
| 2010/0205212 | A1 | 8/2010 | Quadracci et al. | |
| 2010/0281351 | A1 * | 11/2010 | Mohammed .................. | 715/205 |
| 2011/0010180 | A1 * | 1/2011 | Agapi et al. .................. | 704/275 |
| 2011/0173526 | A1 * | 7/2011 | Schwarzbauer et al. ...... | 715/234 |
| 2012/0166451 | A1 | 6/2012 | Arnold et al. | |
| 2012/0233109 | A1 | 9/2012 | Hanneman et al. | |
| 2013/0031325 | A1 | 1/2013 | Nakamoto et al. | |

* cited by examiner

*Primary Examiner* — Tuan Vu (74) *Attorney, Agent, or Firm* — McDonnell Boehnen Hulbert & Berghoff LLP (57) ABSTRACT

A system and methods for embedding objects in source code is disclosed. A non-compilation indicator in a source code is recognized, and an embedded object identifier in the source code is identified. An embedded object indicated by the embedded object identifier is accessed to obtain an embedded object content, and the embedded object content is embedded in the source code.

20 Claims, 4 Drawing Sheets

```
// Assigning E and H fields across the symmetry plane
//
//        ^           ^           ^
//  Ez |      Sym           | Ez
//     o  --->   o   --->   o
//     18   Ex   19   Ex    20
//
//          Hz         Hz
//  Hx --->  ^   -->    ^   ---> Hx
//     o      |   o     |   o
//                Sym
//
ExField(subg0) = kt->Ex;
EyField(subg0) = kt->Ey;
EzField(subg0) = kt->Ez;
HxField(subg0) = kt->Bx;
HyField(subg0) = kt->By;
HzField(subg0) = kt->Bz;
```

100 — (figure label)
104 — (brace for comment block)
102 — (brace for code block)

FIG. 1
(PRIOR ART)

```
/**
<embed> ./img/symmetry_plane.jpg </embed>
**/
ExField(subg0) = kt->Ex;
EyField(subg0) = kt->Ey;
EzField(subg0) = kt->Ez;
HxField(subg0) = kt->Bx;
HyField(subg0) = kt->By;
HzField(subg0) = kt->Bz;
```

200, 204, 206, 208, 210, 212, 214, 202 — (figure labels)

SOURCE CODE FORMAT FOR IDE CODE DEVELOPMENT WITH EMBEDDED OBJECTS

FIELD

Embodiments of the present disclosure relate generally to software development tools. More particularly, embodiments of the present disclosure relate to integrated development environments for software development.

BACKGROUND

An integrated development environment (IDE), integrated design environment, integrated debugging environment, or interactive development environment is a software application that provides tools for programmers to develop software. For example, an IDE may comprise a source code editor, a compiler or interpreter, a build automation tool, a version control system, a class browser, an object inspector, a class hierarchy diagram browser, a debugger, and the like. In general, an IDE is software that computer programmers use to develop programs or applications. An IDE may contain several sub-windows to display source code and various types of information about a project such as a directory, data types, debug information, and the like. Although an IDE is a Graphical User Interface (GUI), code itself is American Standard Code for Information Interchange (ASCII) text to insure portability across platforms, e.g., Windows and UNIX.

Figure 1:
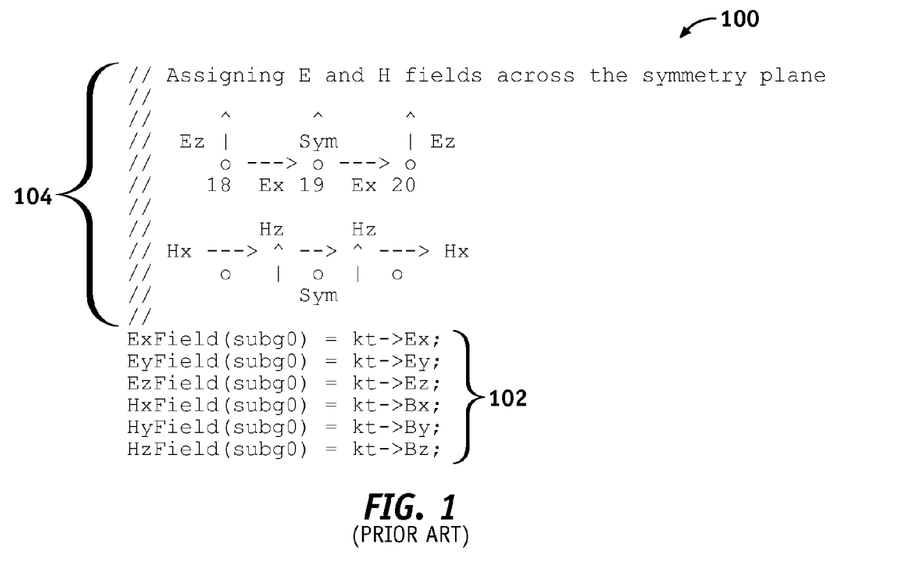
FIG. 1 is an illustration of an exemplary code file comprising an ASCII character diagram interspersed with source code.

Current IDE tools used to help coders write source code are generally limited to only ASCII characters, so comments and diagrams about the code are generally only approximated using crude ASCII text. Inline comments and documentation are also in ASCII text. Containing only ASCII characters is necessary in order for current compilers to be able to read and compile code across various platforms. FIG. 1 is an illustration of an exemplary code file 100 comprising ASCII character diagram 104 interspersed with source code 102. The ASCII character diagram 104 illustrates characteristics and properties of the source code 102. The ASCII character diagram 104 is a commented field.

IDEs typically present a single program in which all development is done. The single program typically provides many features for authoring, modifying, compiling, deploying and debugging software. Abstracting configuration necessary to piece together command line utilities in a cohesive unit may reduce time to learn a programming language, and increase developer productivity. Tight integration of development tasks may further increase productivity. For example, code can be parsed while being written, providing instant feedback on syntax errors.

SUMMARY

A system and methods for embedding objects in source code is disclosed. A non-compilation indicator in a source code is recognized, and an embedded object identifier in the source code is identified. An embedded object indicated by the embedded object identifier is accessed to provide an embedded object content, and the embedded object content is embedded in the source code. In this manner, an integrated development environment for code development with embedded objects is provided. Thereby, programmers may conveniently embed pictures or documents inside a standard program for easy viewing, reference and maintenance.

In an embodiment, a method for embedding objects in source code recognizes a non-compilation indicator in a source code, and identifies an embedded object identifier in the source code. The method further accesses an embedded object indicated by the embedded object identifier, and obtains an embedded object content from the embedded object. The method further embeds the embedded object content in the source code.

In another embodiment, an integrated development environment system comprises a parsing module, an access module, and a presentation module. The parsing module is operable to recognize a non-compilation indicator in a source code, and identify an embedded object identifier in the source code. The access module is operable to access an embedded object indicated by the embedded object identifier to provide an embedded object content. The presentation module is operable to embed the embedded object content in the source code.

In yet another embodiment, a computer readable storage medium comprises computer-executable instructions for performing a method for embedding objects in source code. The method executed by the computer-executable instructions recognizes a non-compilation indicator in the source code, and identifies an embedded object identifier in the source code. Further, the method executed by the computer-executable instructions accesses an embedded object indicated by the embedded object identifier to provide an embedded object content, and embeds the embedded object content in the source code.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to software compilation, integrated development environments, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an integrated development environment. Embodiments of the disclosure, however, are not limited to such integrated development environment applications, and the techniques described herein may also be utilized in other applications. For example but without limitation, embodiments may be applicable to a word processor, an ASCII text utility, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Pictures are not generally compatible with the ASCII text compilers, so there is generally not an easy way to attach an object such as a picture that describes logic into source code other than a text reference to an external document. Embodiments of the disclosure provide a means for pictures or documents to be embedded inside source code without sacrificing portability or breaking current compiling processes.

Figure 2:
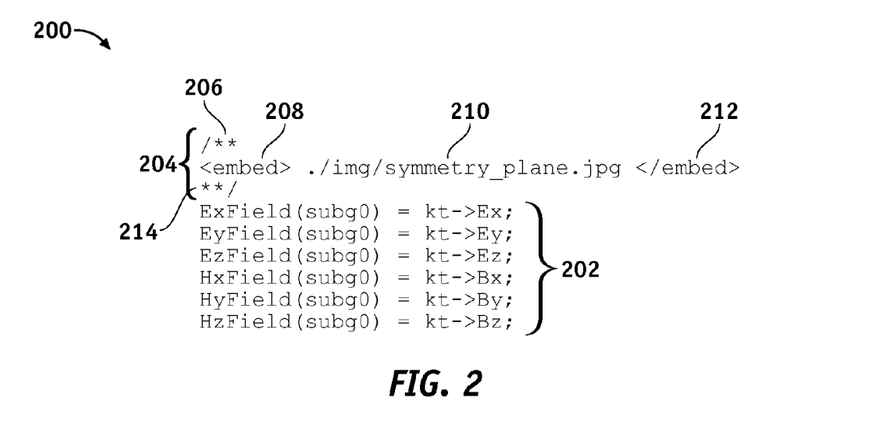
FIG. 2 is an illustration of an exemplary source code showing an embedded object identifier format according to an embodiment of the disclosure.

FIG. 2 is an illustration of an exemplary source code 200 showing an embedded object identifier format 204 according to an embodiment of the disclosure. The embedded object identifier format 204 is embedded in a source code 202. The embedded object identifier format 204 may comprise, for example but without limitation, a non-compilation indicator 206, an embedded object indicator 208, an embedded object identifier 210, an embedded object terminator 212, a resume-compilation indicator 214, and the like.

The non-compilation indicator 206 comprises a comment field that indicates to a compiler to not compile text that follows until the resume-compilation indicator 214 is reached. The non-compilation indicator 206 may comprise, for example but without limitation, a tag, a token, a symbol, a string, a character, and the like. For example, for many compiled languages, the non-compilation indicator 206 comprises "/*" and "//". The non-compilation indicator 206 tells a compiler to ignore extra links or tags added to the code; however, embodiments provide an improved IDE operable to process tags and display an image at an appropriate location.

The embedded object indicator 208 indicates that following text is the embedded object identifier 210. The embedded object indicator 208 may comprise, for example but without limitation, a tag, a token, a symbol, a string, a character, and the like. Embodiments of the disclosure provide an improved IDE that will still generate ASCII text so that current compilers will work; but pictures or another embedded object is enclosed by standard "comment" tags. Within these comment tags are links to pictures, documents or other objects, similar to a Hyper Text Markup Language (HTML) page.

The embedded object identifier 210 identifies an object to embed with the source code 202. The embedded object identifier 210 may comprise, for example but without limitation, a file name, a tag, a character, a token, a symbol, a string, an internet address, and a Uniform Resource Locator, a Uniform Resource Identifier, a Uniform Resource Name, and the like.

An end to the embedded object identifier 210 may be indicated by the embedded object terminator 212. The embedded object terminator 212 may comprise, for example but without limitation, an end-of-line, a line feed, a tag, a token, a symbol, a string, and a character, and the like.

The resume-compilation indicator 214 may indicate to a compiler to resume compilation. The resume-compilation indicator 214 may comprise, for example but without limitation, an end-of-line, a line feed, a tag, a token, a symbol, a string, a character, and the like. For many compiled software languages, the non-compilation indicator 206 may comprise an end-of-line, a line feed, and "*/".

Figure 3:
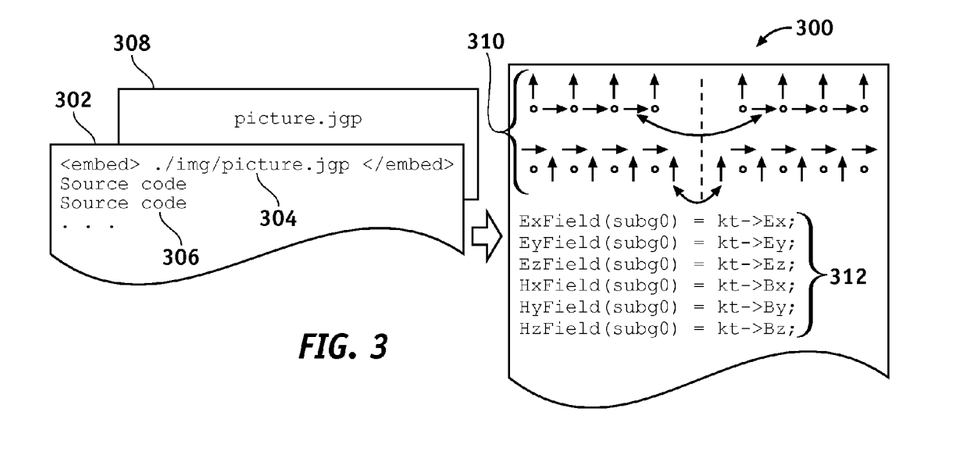
FIG. 3 is an illustration of an exemplary code file comprising an embedded object identifier expanded into an embedded object content according to an embodiment of the disclosure.

FIG. 3 is an illustration of an exemplary code file 300 comprising an embedded object identifier 304 expanded into an embedded object content 310 (e.g., a graphic picture) according to an embodiment of the disclosure. A compiled file 302 comprises the embedded object identifier 304 interspersed with source code 306. The embedded object identifier 304 points to an embedded object 308. The embedded object 308 may comprise, for example but without limitation, a file, a group of files, a data item, an html document, a web page, and the like. The embedded object 308 can be saved, for example but without limitation, in a separate directory, in one file (e.g., so that a user does not need to remember to save the image files or directories that go with the source code 306), and the like. In one embodiment, an option allows a switch to a raw ASCII of the compiled file 302 in response to a command.

The embedded object 308 comprises the embedded object content 310. The embedded object content 310 is extracted from the embedded object 308, and displayed interspersed with the source code 312.

The embedded object content 310 may comprise, for example but without limitation, an image, a picture, a diagram, a text, a document, and the like. An existing IDE shown in FIG. 1 allows only ASCII text, so an attempt on graphics can only be approximated using crude ASCII text. In contrast, according to an embodiment of the disclosure, FIG. 3 shows an improved IDE which allows a programmer to draw a graphic using an external program, and then paste the graphic directly on the IDE code for easy reference and viewing. As a result, debugging and maintenance can be easier.

Figure 4:
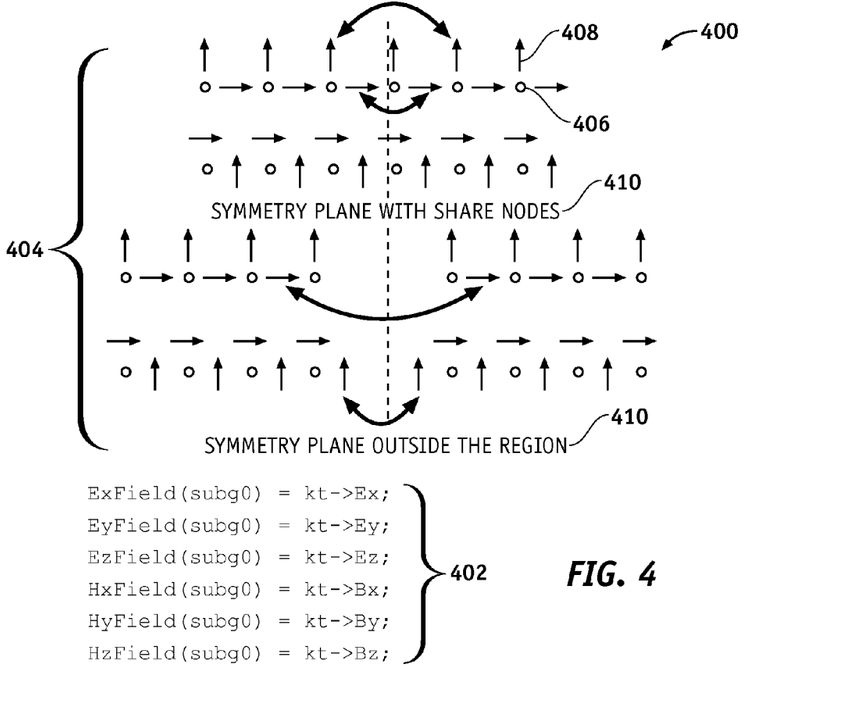
FIG. 4 is an illustration of an expanded view of the embedded object content and source code of FIG. 3 according to an embodiment of the disclosure.

FIG. 4 is an illustration of an expanded view 400 of the embedded object content 310 and the source code 312 of FIG. 3 according to an embodiment of the disclosure. In the embodiment shown in FIG. 4, the embedded object content 404 comprises symbols such as state indicators 406 and transition arcs 408. The embedded object content 404 may be displayed interspersed with a source code 402. In other embodiments, the embedded object content 404 may comprise, for example but without limitation, a hot link so that a diagram pops up if a mouse is over the hot link, code line numbers displayed on a side around the embedded object content 310 for debugging, a hotlink to a different part of source code such as the source code 306, a character string such as character strings 410, a drawn box, one or more arrows for clarity, and the like.

Figure 5:
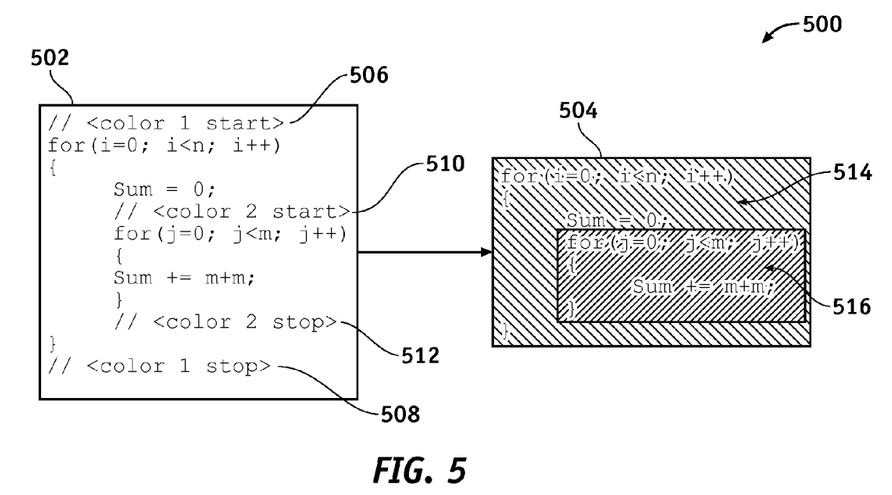
FIG. 5 is an illustration of an exemplary IDE showing program code comprising embedded object identifiers expanded into highlighted code according to an embodiment of the disclosure.

FIG. 5 is an illustration of an exemplary IDE 500 showing program code 502 comprising embedded object identifiers 506/508 expanded into highlighted code 504 according to an embodiment of the disclosure. The embedded object identifiers 506/508 are used to identify highlights for the highlighted code 504. For example, an embedded color 1 start 506 indicates a starting point of color 1 highlighting, and an embedded color 1 stop 508 indicates an ending point of color 1 highlighting. An embedded color 2 start 510 indicates a starting point of color 2 highlighting, and an embedded color 2 stop 512 indicates an ending point of color 2 highlighting. In the highlighted code 504, a first highlighted region 514 can identify a first "for loop", and a second highlighted region 516 can identify a second "for loop" for easy viewing and reference. Using the embedded object identifiers 506/508, a programmer can more efficiently debug a program code.

Figure 6:
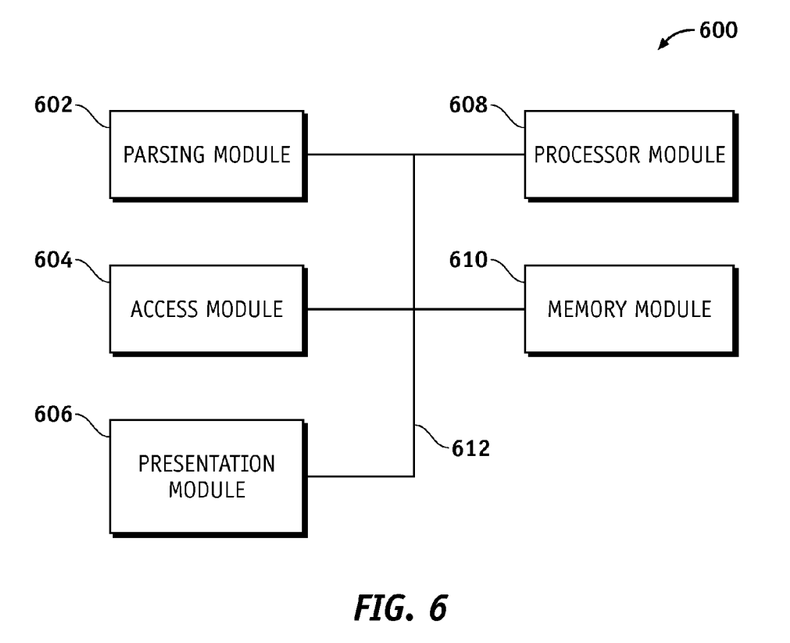
FIG. 6 is an illustration of an integrated development environment system according to an embodiment of the disclosure.

FIG. 6 is an illustration of an integrated development environment system 600 (system 600) according to an embodiment of the disclosure. The system 600 may comprise a parsing module 602, an access module 604, a presentation module 606, a processor module 608, and a memory module 610. The system 600 may represent, for example but without limitation, a desktop, a laptop or notebook computer, a handheld computing device (PDA, cell phone, palmtop, etc.), a mainframe, a server, a client, any other type of special or general purpose computing device as may be desirable or appropriate for a given application or environment, and the like.

A practical system 600 may comprise any number of input modules, any number of processor modules, any number of memory modules, and any number of other modules. The illustrated system 600 depicts a simple embodiment for ease of description. These and other elements of the system 600 are interconnected together, allowing communication between the various elements of system 600. In one embodiment, these and other elements of the system 600 may be interconnected together via a communication link 612. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The parsing module 602 is operable to recognize the non-compilation indicator 206 in the source code 202/306 (FIGS. 2-3), and identify the embedded object identifier 210/304 (FIGS. 2-3) in the source code 202/306.

The access module 604 is operable to access the embedded object indicated by the embedded object identifier 210/304 to provide the embedded object content 310 (FIG. 3).

The presentation module 606 is operable to embed the embedded object content 310 in the source code 202/306.

The processor module 608 comprises processing logic that is configured to carry out the functions, techniques, and processing tasks associated with the operation of the system 600. In particular, the processing logic is configured to support the system 600 described herein. For example, the processor module 608 may direct the access module 604 to access the memory module 610 to access the embedded object 308 indicated by the embedded object identifier 210/304.

For another example, the processor module 608 may direct the parsing module 602 to: recognize the non-compilation indicator 206, identify the embedded object identifier 210/304, and recognize the resume-compilation indicator 214 in the source code 202/306. Also, the processor module 608 may direct the access module 604 to obtain the embedded object content 310 from the embedded object 308, the presentation module 606 to embed the embedded object content 310 in the source code 202, and the system 600 to resume compilation of the source code 202/306.

In this manner, the processor module 608 uses the system 600 to provide an integrated development environment for code development with embedded objects, thereby allowing programmers to conveniently embed pictures or documents inside a standard program for easy viewing, reference and maintenance.

The processor module 608 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 610 may comprise a data storage area with memory formatted to support the operation of the system 600. The memory module 610 is configured to store, maintain, and provide data as needed to support the functionality of the system 600. For example, the memory module 610 may store the embedded object 308, and the like.

In practical embodiments, the memory module 610 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 610 may be coupled to the processor module 608 and configured to store, for example but without limitation, a database, and the like. Additionally, the memory module 610 may represent a dynamically updating database containing a table for updating the database, and the like. The memory module 610 may also store, a computer program that is executed by the processor module 608, an operating system, an application program, tentative data used in executing a program, and the like.

The memory module 610 may be coupled to the processor module 608 such that the processor module 608 can read information from and write information to the memory module 610. For example, as mentioned above, the processor module 608 may access the memory module 610 to access the embedded object 308, and the like.

As an example, the processor module 608 and memory module 610 may reside in respective application specific integrated circuits (ASICs). The memory module 610 may also be integrated into the processor module 608. In an embodiment, the memory module 610 may comprise a cache memory for storing temporary variables or other intermediate information during execution of instructions to be executed by the processor module 608.

Figure 7:
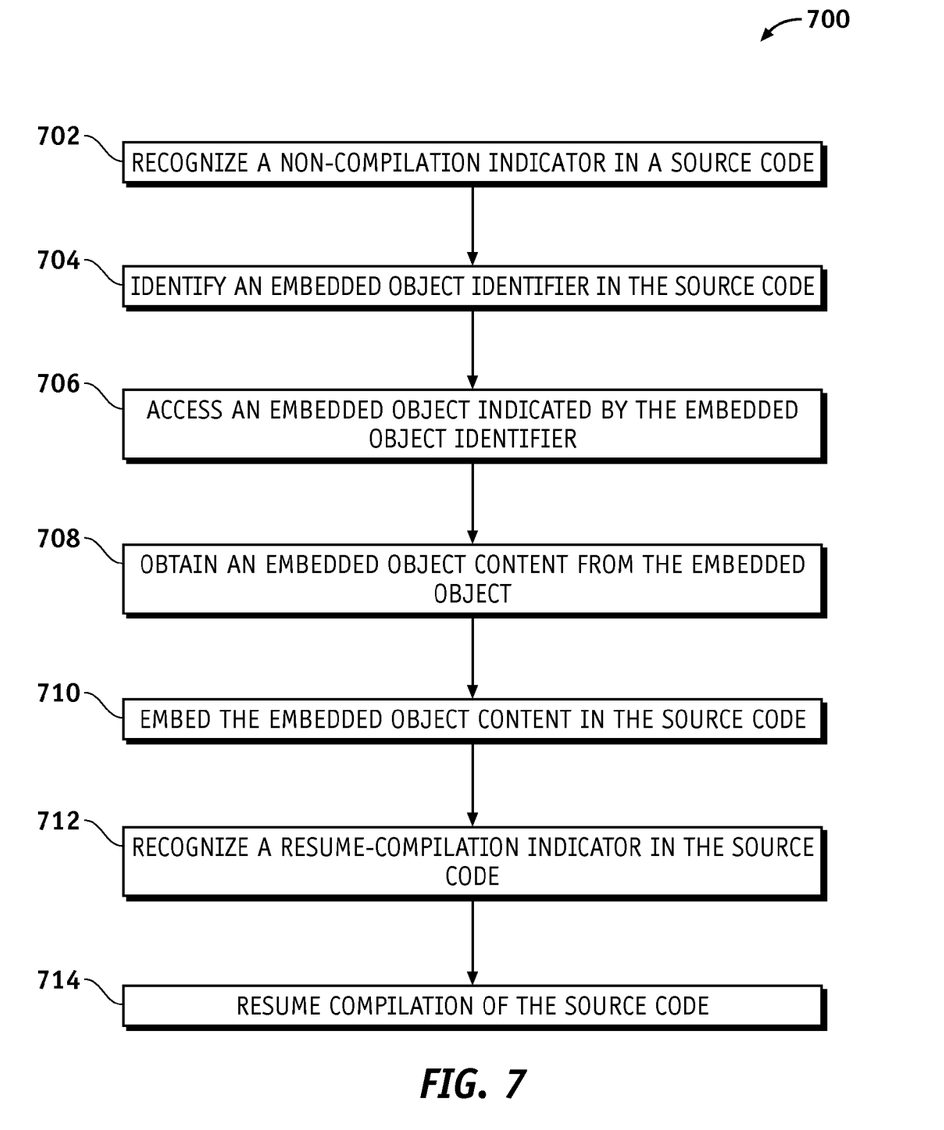
FIG. 7 is an illustration of an exemplary flowchart showing a process for embedding an object in source code according to an embodiment of the disclosure.

FIG. 7 is an illustration of an exemplary flowchart showing a process 700 for embedding an object in source code according to an embodiment of the disclosure. The various tasks performed in connection with process 700 may be performed mechanically, by software, hardware, firmware, a computer-readable medium having computer executable instructions for performing the processes methods, or any combination thereof. It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein.

For illustrative purposes, the following description of process 700 may refer to elements mentioned above in connection with FIGS. 2-6. In practical embodiments, portions of the process 700 may be performed by different elements of the system 600 such as: the parsing module 602, the access module 604, the presentation module 606, the processor module 608, and the memory module 610, etc. Process 700 may have functions, material, and structures that are similar to the embodiments shown in FIGS. 2-6. Therefore, common features, functions, and elements may not be redundantly described here.

Process 700 may begin by the parsing module 602 recognizing a non-compilation indicator such as the non-compilation indicator 206 in a source code such as the source code 202/306 (task 702).

Process 700 may continue by the parsing module 602 identifying an embedded object identifier such as the embedded object identifier 210/304 in the source code 202/306 (task 704).

Process 700 may continue by the access module 604 accessing an embedded object such as the embedded object 308 indicated by the embedded object identifier 210/304 (task 706).

Process 700 may continue by the access module 604 obtaining an embedded object content such as the embedded object content 310 from the embedded object 308 (task 708).

Process 700 may continue by the presentation module 606 embedding the embedded object content 310 in the source code 202/306 (task 710).

Process 700 may continue by the parsing module 602 recognizing a resume-compilation indicator such as the resume-compilation indicator 214 in the source code 202/306 (task 712).

Process 700 may continue by the system 600 resuming compilation of the source code 202/306 (task 714).

In this manner, the embodiments of the disclosure provide integrated development environment for code development with embedded objects. Thereby, programmers may conveniently embed pictures or documents inside a standard program for easy viewing, reference and maintenance.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 608 to cause the processor module 608 to perform specified operations. Such instructions, generally referred to as "computer program code" or "program code" (which may be grouped in the form of computer programs or other groupings), when executed, enable power utilization scheduling methods of the system 600.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for embedding objects in programming source code in an integrated development environment (IDE), wherein the IDE comprises a text editor for editing the programming source code and a compiler, the method comprising:
- receiving, by the IDE, an embedded object content to be embedded within the programming source code, wherein the embedded object content comprises an image, and wherein the programming source code is compilable into an executable binary;
- saving, by the IDE, an embedded object comprising the embedded object content in a directory;
- embedding, by the IDE, an embedded object identifier in a comment field of the programming source code, wherein the embedded object identifier points to the saved embedded object, and wherein the comment field indicates text to be ignored by the compiler;
- displaying, within the text editor, the programming source code;
- processing, by the IDE, the comment field of the programming source code;
- recognizing, by the IDE, a non-compilation indicator associated with the comment field in the programming source code;
- determining, by the IDE, that the comment field comprises the embedded object identifier; and
- responsive to determining that the comment field comprises the embedded object identifier:
  - accessing, by the IDE, the saved embedded object indicated by the embedded object identifier,
  - obtaining, by the IDE, the embedded object content, comprising the image, from the saved embedded object, and
  - displaying, prior to compilation of the programming source code within the text editor and interspersed with the programming source code, the image for reference during coding of the programming source code, wherein the image is displayed in place of the embedded object identifier of the comment field.

2. The method according to claim 1, wherein the non-compilation indicator comprises at least one member selected from the group consisting of: a tag, a token, a symbol, a string, and a character.

3. The method according to claim 1, wherein the embedded object identifier comprises at least one member selected from the group consisting of: a file name, a character, a tag, a token, a symbol, a string, an internet address, and a Uniform Resource Locator, a Uniform Resource Identifier, and a Uniform Resource Name.

4. The method according to claim 1, wherein the embedded object comprises at least one member selected from the group consisting of: a file, a group of files, a data item, an html document, and a web page.

5. The method according to claim 1, wherein the embedded object content further comprises at least one member selected from the group consisting of: a picture, a diagram, a text, and a document, and wherein the method further comprises displaying the at least one member within the text editor.

6. The method according to claim 1, further comprising: recognizing, by the IDE, a resume-compilation indicator indicating the presence of the comment field.

7. The method according to claim 6, wherein the resume-compilation indicator comprises at least one member selected from the group consisting of: a tag, a token, an end-of-line, a line feed, a symbol, a string, and a character.

8. The method of claim 1, wherein the embedded object identifier comprises an embedded color indicator that indicates a highlight color and an area of text in the programming source code to be highlighted with the highlight color in the text editor.

9. The method of claim 1, further comprising:
- editing the programming source code in the text editor in response to a programmer input; and
- receiving the non-compilation indicator into the programming source code in the text editor in response to the programmer input.

10. The method of claim 1, further comprising displaying the programming source code and the image within the text editor in response to receiving a command to view the programming source code of a compiled file.

11. An integrated development environment (IDE) system for embedding objects in programming source code in an IDE, wherein the IDE comprises a text editor for editing the programming source code and a compiler, the IDE system comprising:
- a processor; and
- a computer readable storage device comprising computer-executable instructions executable by the processor to perform IDE operations comprising:
  - receiving an embedded object content to be embedded within the programming source code, wherein the embedded object content comprises an image, and wherein the programming source code is compilable into an executable binary,
  - saving an embedded object comprising the embedded object content in a directory,
  - embedding an embedded object identifier in a comment field of the programming source code, wherein the embedded object identifier points to the saved embedded object, and wherein the comment field indicates text to be ignored by the compiler,
  - displaying, within the text editor, the programming source code,
  - processing the comment field of the programming source code,
  - recognizing a non-compilation indicator associated with the comment field in the programming source code,
  - determining that the comment field comprises the embedded object identifier, and
  - responsive to determining that the comment field comprises the embedded object identifier:
    - accessing the saved embedded object indicated by the embedded object identifier;
    - obtaining the embedded object content, comprising the image, from the saved embedded object; and
    - displaying, prior to compilation of the programming source code within the text editor and interspersed with the programming source code, the image for reference during coding of the programming source code, wherein the image is displayed in place of the embedded object identifier of the comment field.

12. The (IDE) system according to claim 11, wherein the non-compilation indicator comprises at least one member selected from the group consisting of: a tag, a token, a symbol, a string, and a character.

13. The (IDE) system according to claim 11, wherein the embedded object identifier comprises at least one member selected from the group consisting of: a file name, a tag, a character, a token, a symbol, a string, an internet address, and a Uniform Resource Locator, a Uniform Resource Identifier, and a Uniform Resource Name.

14. The (IDE) system according to claim 11, wherein the embedded object comprises at least one member selected from the group consisting of: a file, a group of files, a data item, an html document, and a web page.

15. The (IDE) system according to claim 11, wherein the embedded object content further comprises at least one member selected from the group consisting of: a picture, a diagram, a text, and a document, and wherein the IDE operations further comprise displaying the at least one member within the text editor.

16. The (IDE) system according to claim 11, wherein IDE operations further comprise recognizing a resume-compilation indicator indicating the presence of the comment field.

17. The system of claim 11, wherein the embedded object identifier comprises an embedded color indicator that indicates a highlight color and an area of text in the programming source code to be highlighted with the highlight color in the text editor.

18. A computer readable storage device comprising computer-executable instructions for performing IDE operations for embedding objects in programming source code in an integrated development environment (IDE), wherein the IDE comprises a text editor for editing the programming source code and a compiler, the IDE operations comprising:
    receiving an embedded object content to be embedded within the programming source code, wherein the embedded object content comprises an image, and wherein the programming source code is compilable into an executable binary;
    saving an embedded object comprising the embedded object content in a directory;
    embedding an embedded object identifier in a comment field of the programming source code, wherein the embedded object identifier points to the saved embedded object, and wherein the comment field indicates text to be ignored by the compiler;
    displaying, within the text editor, the programming source code;
    processing the comment field of the programming source code;
    recognizing a non-compilation indicator associated with the comment field in the programming source code;
    determining that the comment field comprises an embedded object identifier; and
    responsive to determining that the comment field comprises the embedded object identifier:
        accessing the saved embedded object indicated by the embedded object identifier,
        obtaining the embedded object content, comprising the image, from the saved embedded object, and
        displaying, prior to compilation of the programming source code within the text editor and interspersed with the programming source code, the image for reference during coding of the programming source code, wherein the image is displayed in place of the embedded object identifier of the comment field.

19. The computer readable storage device according to claim 18, wherein the IDE operations further comprise:
    recognizing a resume-compilation indicator indicating the presence of the comment field.

20. The computer readable storage device of claim 18, wherein the embedded object identifier comprises an embedded color indicator that indicates a highlight color and an area of text in the programming source code to be highlighted with the highlight color in the text editor.

\* \* \* \* \*